F. F. NELSON.
VIEW FINDING DEVICE.
APPLICATION FILED FEB. 25, 1920.
1,400,901.
Patented Dec. 20, 1921.
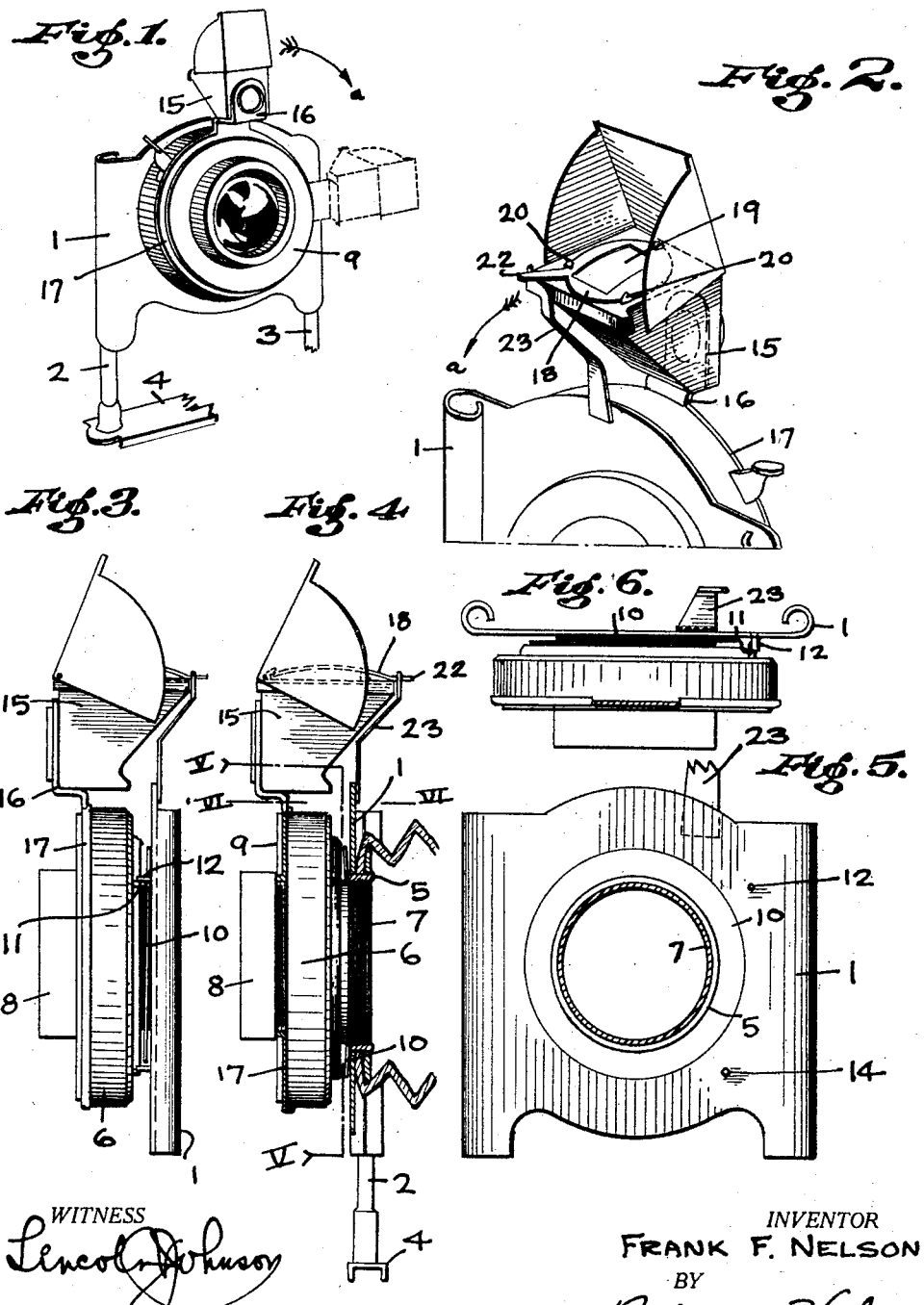
WITNESS
Lincoln Johnson
INVENTOR
FRANK F. NELSON
BY
Baldwin Vale
ATTORNEY

UNITED STATES PATENT OFFICE.

FRANK F. NELSON, OF SAN FRANCISCO, CALIFORNIA.

VIEW-FINDING DEVICE.

1,400,901.  Specification of Letters Patent.  Patented Dec. 20, 1921.

Application filed February 25, 1920. Serial No. 361,361.

*To all whom it may concern:*

Be it known that I, FRANK F. NELSON, a citizen of the United States, and a resident of the city and county of San Francisco, State of California, have made a new and useful invention—to wit, Improvements in View-Finding Devices; and I do hereby declare the following to be a full, clear, concise, and exact description of the same.

This invention relates particularly to a combined image finder and revoluble shutter mounting.

The invention comprehends a new and useful combination of shutter mounting and image finder, whereby the image finder is placed contiguous to the focal axis and maintained equidistant therefrom irrespective of the radial movement of shutter mounting.

A further object of the invention is to provide a self matting image finder, automatically operated by rotation of the shutter mounting. A still further object is to provide a shutter mounting which permits all of the operating parts to be readily accessible to the fingers of the operator when the camera is in either a vertical or horizontal position, and to provide a device of this nature which will be of extremely simple construction, cheap to manufacture, compact in form and a general improvement over lens mountings now on the market.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings,

Figure 1 is a perspective view of the frame carrying the lens mounting and shutter.

Fig. 2 is an enlarged perspective from the rear of the image finder.

Fig. 3 is a side elevation of the lens mounting and image finder.

Fig. 4 is a partial vertical section through Fig. 3.

Fig. 5 is a front elevation of the lens mounting frame taken on the line V—V of Fig. 4.

Fig. 6 is a plan view in elevation of Fig. 4 taken on the line VI—VI.

In detail the structure illustrated in the drawings comprises the lens and shutter mounting, supporting frame 1, secured on the vertical columns 2 and 3, which are secured in the transverse frame 4 adapted to slide on the standard tracks provided in the cover of a collapsible camera. Although I have described the lens frame 1 as part of a folding camera, I do not wish to limit myself to this construction because the invention hereinafter described can be applied to any form of camera.

The supporting frame 1 is provided with a threaded projecting shoulder 5 to which the lens mounting 6 is adapted to be screwed. The annular projecting shoulder 5 may be either internally or externally threaded for receiving the lens mounting, and, as shown in Fig. 4 the same is interiorly threaded to receive the externally threaded shoulder 7 provided on the lens mounting. The usual lens and shutter containing casing 8 is adapted to be screwed in the center of the front face of the mounting 6, adjacent the shutter and diaphragm stop indicator plate 9 fixed on the front face of the lens mounting.

Standard practice has been to secure the lens mountings 6 to the supporting frame 1 by the threaded means previously described rather than by fastening permanently to the supporting frame by screws or other means. In adapting my invention to the standard camera, I have unscrewed the lens mounting away from the supporting frame until the same is free to revolve a quarter turn in either direction, and, I have interposed the flat annular tension spring 10 between it and the front face of the supporting frame. This spring acts to permanently hold the combined lens mounting and image finder normally in any adjusted position.

The set screw 11 is secured on the rear face of the lens mounting 6 and projects therefrom. A similar projecting pin 12 is provided on the front face of the frame 1, which latter pin is adapted to engage the stop pin 11 and thus limit the revoluble action thereof. When the lens mounting is moved through an arc of 90° in the direction of the arrow "a" as shown in Fig. 1 the stop pin 11 engages the projecting pin 14 on the front face of the frame 1 which limits the rotative movement of the lens mounting and places the lens, together with the image finder in horizontal position for viewing a picture.

The image finder 15 of any suitable type, is mounted on the supporting frame 16 secured to the lens mounting 6 in any desirable manner, but preferably formed as an integral part thereof. In the present instance I have shown the image finder mounting as an annular plate 17 secured to the front face of the lens mounting 6, behind the shutter and diaphragm stop indicator plate 9, and provided with the vertical extension 16 which is secured to the body of the image finder 15.

The upper face of the image finder, through which the eye of the operator gazes to sight the view, is ordinarily provided with a single opening, outlined like a rectangle and which acts to "frame" the picture when the camera is aimed either in the vertical or horizontal position. Ordinarily in taking a picture in the horizontal position it becomes necessary to manually turn the image finder through an arc of 90° so that the same can be looked through by the operator with the resultant disadvantage that the image finder is away from the focal axis and the exposure lever is on the under side of the camera and away from the fingers of the operator, and awkward to manipulate.

The image finder, rigidly connected to the shutter mounting, moves to whatsoever position the mounting may be turned. The top frame 18 of the finder which is automatically self-matting is provided with but one rectangular sight opening 19 and is revolubly mounted within the guide members 20 secured to the top face of the image finder mounting. The term self-matting as here used can be defined as the means by which the sight "frame" of the image finder is automatically revolved, as the lens and shutter mounting is rotated from a vertical to the horizontal position or vice versa. The member 18 is provided with the rearwardly projecting arm 22 adapted to be engaged by the resilient member 23, secured to the rear of the lens supporting frame 1. It will be seen by reference to Fig. 2 that by moving the shutter mounting radially, the frame arm 22 will engage the stationary projection 23 and automatically move through an arc of 90° and place the same in position for sighting a picture in horizontal position.

The advantage of combining image finder and shutter mounting, consists in always maintaining the focal centers in the same relative position, which permits a quick and positive aim with the assurance that part of the picture will not be cut off. The exposure lever for operating the shutter is as easily operated when the camera is in the horizontal position as when in the vertical, by eliminating the awkward manipulation thereof as is the case at the present time when cameras constructed according to standard methods are turned to the horizontal position for taking a picture.

Having thus described this invention, what I claim and desire to secure by Letters Patent is:

A view finding device for cameras comprising in combination a lens mounting and an image finder fixedly mounted thereon, said lens mounting being rotatable relative to the camera; means for limiting the rotative movement of said lens mounting; a matting frame revolubly mounted on said image finder; means on said matting frame for engaging a relatively stationary part of the camera, whereby said matting frame is revolved synchronously with the rotative movement of said lens mounting, into either the vertical or horizontal planes.

In testimony whereof, I have hereunto set my hand at San Francisco, California, this 17th day of February, 1920.

FRANK F. NELSON.

In presence of—
LINCOLN V. JOHNSON.